United States Patent
Gupta et al.

(10) Patent No.: US 8,596,781 B2
(45) Date of Patent: Dec. 3, 2013

(54) FLUID FILLED LENS RESERVOIR SYSTEM AND MANUFACTURING METHOD OF THE RESERVOIR SYSTEM

(75) Inventors: Amitava Gupta, Roanoke, VA (US); William Egan, Jackson, WY (US); Lisa Nibauer, Short Hills, NJ (US); Bruce Decker, Solebury, PA (US); Urban Schnell, Munchenbuchsee (CH); Karim Haroud, Chavannes-sur-Moudon (CH); Pascal Loser, Bern (CH); Michel Saint-Ghislain, Dudingen (CH); Daniel Senatore, San Francisco, CA (US); Matthew Wallace Peterson, San Francisco, CA (US)

(73) Assignee: Adlens Beacon, Inc., Pembroke Park, FL (US)

( * ) Notice: Subject to any disclaimer, the term of this patent is extended or adjusted under 35 U.S.C. 154(b) by 140 days.

(21) Appl. No.: 12/904,736

(22) Filed: Oct. 14, 2010

(65) Prior Publication Data

US 2011/0102735 A1 May 5, 2011

Related U.S. Application Data

(60) Provisional application No. 61/251,819, filed on Oct. 15, 2009.

(51) Int. Cl.
*G02C 5/14* (2006.01)
*G02C 7/08* (2006.01)
*G02B 3/12* (2006.01)

(52) U.S. Cl.
CPC .............. *G02C 5/143* (2013.01); *G02C 7/085* (2013.01); *G02B 3/12* (2013.01)
USPC ...................... 351/121; 351/159.68; 359/665

(58) Field of Classification Search
CPC ........... G02C 5/143; G02C 7/085; G02B 3/12
USPC ......... 351/41, 111, 121, 158, 159.01, 159.04, 351/159.34, 159.68; 359/665, 666
See application file for complete search history.

(56) References Cited

U.S. PATENT DOCUMENTS 2,576,581 A * 11/1951 Edwards ........................ 351/41
2,836,101 A   5/1958 De Swart
(Continued)

FOREIGN PATENT DOCUMENTS

WO    WO 2008/063442 A1    5/2008

OTHER PUBLICATIONS

Borish, I.M., *Clinical Refraction*, 3rd Edition, Chapter 26 (pp. 1051-1113), The Professional Press, Inc., New York (1970).

(Continued)

*Primary Examiner* — Huy K Mai
(74) *Attorney, Agent, or Firm* — Sterne, Kessler, Goldstein & Fox P.L.L.C.

(57) ABSTRACT

Disclosed are apparatuses and manufacturing methods for a fluid filled lens reservoir system. The eyeglass reservoir system includes a temple piece having a cavity, a bladder positioned within the cavity and configured to repeatedly compress and relax, the bladder being made of a flexible material, and a connecting tube coupled to an inlet port of a lens module and to the bladder, configured to carry a fluid between the bladder and a fluid filled lens cavity of the lens module. The eyeglass reservoir system further comprises a compression arm contacting the bladder and configured to transmit force from an actuator to the bladder to cause movement of the fluid between the bladder and the connecting tube. The bladder and connecting tube are made of a flexible material such as polyvinyledende difluoride. The connecting tube further comprises a flared end configured to couple to the inlet port of the lens module.

26 Claims, 9 Drawing Sheets

(56) References Cited

U.S. PATENT DOCUMENTS

| | | | |
|---|---|---|---|
| 2,976,766 | A | 3/1961 | Bianchi |
| 3,598,479 | A | 8/1971 | Wright |
| 3,614,215 | A * | 10/1971 | Mackta ............ 351/41 |
| 4,181,408 | A | 1/1980 | Senders |
| 4,209,013 | A * | 6/1980 | Alexander et al. ............ 604/28 |
| 4,477,158 | A | 10/1984 | Pollock et al. |
| 4,890,903 | A | 1/1990 | Treisman et al. |
| 4,913,536 | A | 4/1990 | Barnea |
| 5,080,476 | A | 1/1992 | Monin |
| 5,138,494 | A | 8/1992 | Kurtin |
| 5,182,585 | A * | 1/1993 | Stoner ............ 351/41 |
| 5,229,885 | A | 7/1993 | Quaglia |
| 5,371,629 | A | 12/1994 | Kurtin et al. |
| 5,440,357 | A | 8/1995 | Quaglia |
| 5,515,203 | A | 5/1996 | Nye |
| 5,563,528 | A | 10/1996 | Diba et al. |
| 5,574,598 | A | 11/1996 | Koumura et al. |
| 5,636,368 | A | 6/1997 | Harrison et al. |
| 5,668,620 | A | 9/1997 | Kurtin et al. |
| 5,684,637 | A | 11/1997 | Floyd |
| 5,719,397 | A | 2/1998 | Hallett et al. |
| 5,731,909 | A | 3/1998 | Schachar |
| 5,739,959 | A | 4/1998 | Quaglia |
| 5,774,273 | A | 6/1998 | Bornhorst |
| 5,790,882 | A | 8/1998 | Silver et al. |
| 5,900,921 | A | 5/1999 | Min |
| 5,952,846 | A | 9/1999 | Silver |
| 5,956,183 | A | 9/1999 | Epstein et al. |
| 5,963,048 | A | 10/1999 | Harrison et al. |
| 5,973,852 | A | 10/1999 | Task |
| 5,999,328 | A | 12/1999 | Kurtin et al. |
| 6,040,947 | A | 3/2000 | Kurtin et al. |
| 6,053,610 | A | 4/2000 | Kurtin et al. |
| 6,069,742 | A | 5/2000 | Silver |
| 6,091,892 | A | 7/2000 | Xue et al. |
| 6,188,525 | B1 | 2/2001 | Silver |
| 6,246,528 | B1 | 6/2001 | Schachar |
| 6,493,151 | B2 | 12/2002 | Schachar |
| 6,552,860 | B1 | 4/2003 | Alden |
| 6,618,208 | B1 | 9/2003 | Silver |
| 6,626,532 | B1 | 9/2003 | Nishioka et al. |
| 6,715,876 | B2 | 4/2004 | Floyd |
| 6,836,374 | B2 | 12/2004 | Esch et al. |
| 6,930,838 | B2 | 8/2005 | Schachar |
| 6,992,843 | B2 | 1/2006 | Juhala |
| 7,068,439 | B2 | 6/2006 | Esch et al. |
| 7,085,065 | B2 | 8/2006 | Silver |
| 7,142,369 | B2 | 11/2006 | Wu et al. |
| 7,256,943 | B1 | 8/2007 | Kobrin et al. |
| 7,261,736 | B1 | 8/2007 | Azar |
| 7,324,287 | B1 | 1/2008 | Gollier |
| 7,325,922 | B2 | 2/2008 | Spivey |
| 7,338,159 | B2 | 3/2008 | Spivey |
| 7,342,733 | B2 | 3/2008 | Takei |
| 7,369,321 | B1 | 5/2008 | Ren et al. |
| 7,382,544 | B2 | 6/2008 | Cernasov |
| 7,423,811 | B2 | 9/2008 | Silver |
| 7,440,193 | B2 | 10/2008 | Gunasekaran et al. |
| 7,453,646 | B2 | 11/2008 | Lo |
| 7,475,985 | B2 | 1/2009 | Blum et al. |
| 7,580,195 | B2 | 8/2009 | Choi et al. |
| 7,580,197 | B2 | 8/2009 | Omura et al. |
| 7,594,726 | B2 | 9/2009 | Silver |
| 7,604,349 | B2 | 10/2009 | Blum et al. |
| 2004/0240076 | A1 | 12/2004 | Silver |
| 2005/0140922 | A1 | 6/2005 | Bekerman et al. |
| 2006/0066808 | A1 | 3/2006 | Blum et al. |
| 2006/0077562 | A1 | 4/2006 | Silver |
| 2006/0164731 | A1 | 7/2006 | Wu et al. |
| 2006/0245071 | A1 | 11/2006 | George et al. |
| 2006/0250699 | A1 | 11/2006 | Silver |
| 2007/0030573 | A1 | 2/2007 | Batchko et al. |
| 2007/0211207 | A1 | 9/2007 | Lo et al. |
| 2008/0002150 | A1 | 1/2008 | Blum et al. |
| 2008/0007689 | A1 | 1/2008 | Silver |
| 2008/0008600 | A1 | 1/2008 | Silver |
| 2008/0019015 | A1 | 1/2008 | Fernandez et al. |
| 2008/0084532 | A1 | 4/2008 | Kurtin |
| 2008/0112059 | A1 | 5/2008 | Choi et al. |
| 2008/0218873 | A1 | 9/2008 | Batchko et al. |
| 2008/0231963 | A1 | 9/2008 | Batchko et al. |
| 2008/0285143 | A1 | 11/2008 | Batchko et al. |
| 2008/0316587 | A1 | 12/2008 | Tijburg et al. |
| 2009/0021843 | A1 | 1/2009 | Obrebski et al. |
| 2009/0052049 | A1 | 2/2009 | Batchko et al. |
| 2009/0086331 | A1 | 4/2009 | Gunasekaran et al. |
| 2009/0116118 | A1 | 5/2009 | Frazier et al. |
| 2009/0128922 | A1 | 5/2009 | Justis et al. |
| 2009/0195882 | A1 | 8/2009 | Bolle et al. |
| 2009/0213471 | A1 | 8/2009 | Silver et al. |
| 2009/0251792 | A1 | 10/2009 | Suzuki et al. |
| 2010/0045930 | A1 | 2/2010 | Silver et al. |
| 2010/0053543 | A1 | 3/2010 | Silver et al. |
| 2010/0208194 | A1 | 8/2010 | Gupta et al. |
| 2010/0208195 | A1 | 8/2010 | Gupta et al. |

OTHER PUBLICATIONS

Jalie, M., *The Principles of Ophthalmic Lenses*, 4th Edition, Chapter 18 (pp. 413-468), The Association of Dispensing Opticians, Hazell Watson & Viney Limited, London (1984).

Markoff, J., "Scientists At Work: Stephen Kurtin—Making Eyeglasses That Let Wearers Change Focus on the Fly," *The New York Times*, 3 pages (Aug. 4, 2009).

Tang, S.K.Y. et al., "Dynamically Reconfigurable Fluid Core Fluid Cladding Lens in a Microfluidic Channel," *Lab on a Chip*, vol. 8, No. 3, p. 395-401 (Mar. 2008).

Gupta, A. et al., U.S. Appl. No. 12/579,203, filed Oct. 14, 2009, entitled "Aspheric Fluid Filled Lens Optic."

Gupta, A. et al., U.S. Appl. No. 12/848,910, filed Aug. 2, 2010, entitled "Non-Round Fluid Filled Lens Optic."

Gupta, A. et al., U.S. Appl. No. 12/855,465, filed Aug. 12, 2010, entitled "Fluid-Filled Lenses and their Opthalmic Applications."

Senatore, D. et al., U.S. Appl. No. 12/904,720, filed Oct. 14, 2010, entitled "Fluid Filled Lenses and Mechanisms of Inflation Thereof."

Senatore, D. et al., U.S. Appl. No. 12/904,769, filed Oct. 14, 2010, entitled "Hinge Mechanism for a Fluid Filled Lens Assembly."

Senatore, D. et al., U.S. Appl. No. 13/000,887, filed Dec. 22, 2010, entitled "Fluid Filled Lenses and Mechanisms of Inflation Thereof."

* cited by examiner

SECTION A-A
SCALE 16.000

FIG. 4B

SECTION B-B
SCALE 16.000

FIG. 4C

SECTION C-C
SCALE 16.000

//FLUID FILLED LENS RESERVOIR SYSTEM AND MANUFACTURING METHOD OF THE RESERVOIR SYSTEM

CROSS REFERENCE TO RELATED APPLICATIONS

This application claims priority to U.S. Provisional Patent Application No. 61/251,819, filed Oct. 15, 2009, which is incorporated herein by reference in its entirety.

BACKGROUND

1. Field

Embodiments of the present invention relate to fluid-filled lenses and in particular to a reservoir for storing and supplying a fluid.

2. Background Art

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses including a wide dynamic range, ability to provide adaptive correction, robustness and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications, although not limited to them (see, e.g., U.S. Pat. No. 6,618,208, which is incorporated by reference in its entirety). Power adjustment in fluid lenses has been effected by injecting additional fluid into a lens cavity, by electrowetting, by application of ultrasonic impulse, and by utilizing swelling forces in a cross-linked polymer upon introduction of a swelling agent such as water.

SUMMARY

In one embodiment of the present invention, the state of inflation of a sealed fluid filled lens is controllably altered by compressing a fluid filled reservoir that is sealed at one end and is connected to the cavity of the fluid filled lens on the other.

In an embodiment, the fluid filled reservoir includes two sections, a wider section providing the space for storage of excess fluid, while a narrower section functions as a connecting tube between said wider section and an inlet to the sealed lens cavity being threaded through the hinge. The reservoir may be fabricated of a polymer that is impermeable to the fluid and foamed to accommodate the bending and unbending of a hinge.

An embodiment of the present invention includes an eyeglass reservoir system for storing fluid to supply a fluid filled lens of a pair of eyeglasses. The eyeglass reservoir system may include a temple piece having a cavity, a bladder positioned within the cavity and configured to repeatedly compress and relax, the bladder being made of a flexible material, and a connecting tube coupled to an inlet port of a lens module and to the bladder, configured to carry a fluid between the bladder and a fluid filled lens cavity of the lens module. The eyeglass reservoir system may further include a compression arm contacting the bladder and configured to transmit force from an actuator to the bladder. The bladder and connecting tube may be separately formed and joined together or may be two portions of a single tube. The shape of the bladder may be cylindrical or ellipsoidal with the bladder being wider, respectively, than the connecting tube. The bladder and connecting tube are made of a flexible material such as polyvinyledende difluoride. The connecting tube may further include a flared end configured to couple to the inlet port of the lens module.

An embodiment of the present invention additionally includes an apparatus, including a flexible bladder configured to repeatedly compress and relax, a flexible connecting tube having a flared end and a non-flared end, the non-flared end coupled to the bladder, the connecting tube configured to narrow and extend a passage length of the bladder, wherein the connecting tube is further configured to carry a fluid from and to the bladder; and a compression arm contacting the bladder and configured to apply pressure to the bladder.

Additionally, an embodiment of the present invention includes a device manufacturing method, including placing a first unprocessed tube of a first processable material having a first diameter and first and second openings at opposite ends over a tubular reservoir profile having a cylindrical or elliptical cross-section, such that one end of the first unprocessed tube associated with the first opening and one end of the tubular reservoir profile are approximately even. The device manufacturing method further includes processing the first processable material such that a first processed tube forms around the tubular reservoir profile and contracts, at the end associated with the second opening, smaller than the tubular reservoir profile to create a reduced diameter opening. Another step of the device manufacturing method includes removing the tubular reservoir profile from the first processed tube and sealing the first opening. Additionally, the device manufacturing method includes placing a first opening of a second unprocessed tube of a second diameter over the reduced diameter opening of the first processed tube, the second unprocessed tube being made of a second processable material. Still another step of the device manufacturing method includes placing an inlet profile in a second opening of the second unprocessed tube and processing the second processable material such that a second processed tube forms around the reduced opening of the first tube and the inlet profile to form a flared opening. The device manufacturing method further includes placing a first adhesive around an inside rim of the first opening of the first processed tube and placing a second adhesive around an outside rim of the reduced diameter opening, or an inside rim of the first opening of the second processed tube, or both.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Design of a pair of eyeglasses including fluid filled lenses may utilize seamless integration of all of the components of the fluid filled lens into an eyeglass frame without compromising either the adjustability of optical power of the fluid filled lens or the frame and temple designs, both from the ergonomic and aesthetic perspectives.

A pair of eyeglasses having fluid filled lenses may include, for example and without limitation: (1) two fluid filled lens modules; (2) two connecting tubes, each connecting the inlet port of a lens module to a corresponding reservoir to form a sealed system and threaded through a hinge; (3) two fluid filled reservoirs made of a flexible material that can be compressed and relaxed reversibly for a large number of cycles, connected to the lens modules by means of the connecting tubes; (4) hinges that provide a channel that houses the connecting tube and allows it to flex during the operation of the hinge without causing the connecting tube to crimp; and (5) two actuators that compress the respective reservoirs reversibly and controllably by means of movement of, for example and without limitation, a wheel or a screw, located on the side of each temple piece.

A design that provides the ability to separately adjust the right and the left optic by the wearer is deemed ergonomically superior than a design that requires adjustment of the optics in tandem, since it leads to direct tactile connection between the extent of adjustment of the actuator position and the clarity and magnification of the retinal image formed by the fluid filled lenses.

Figure 1:
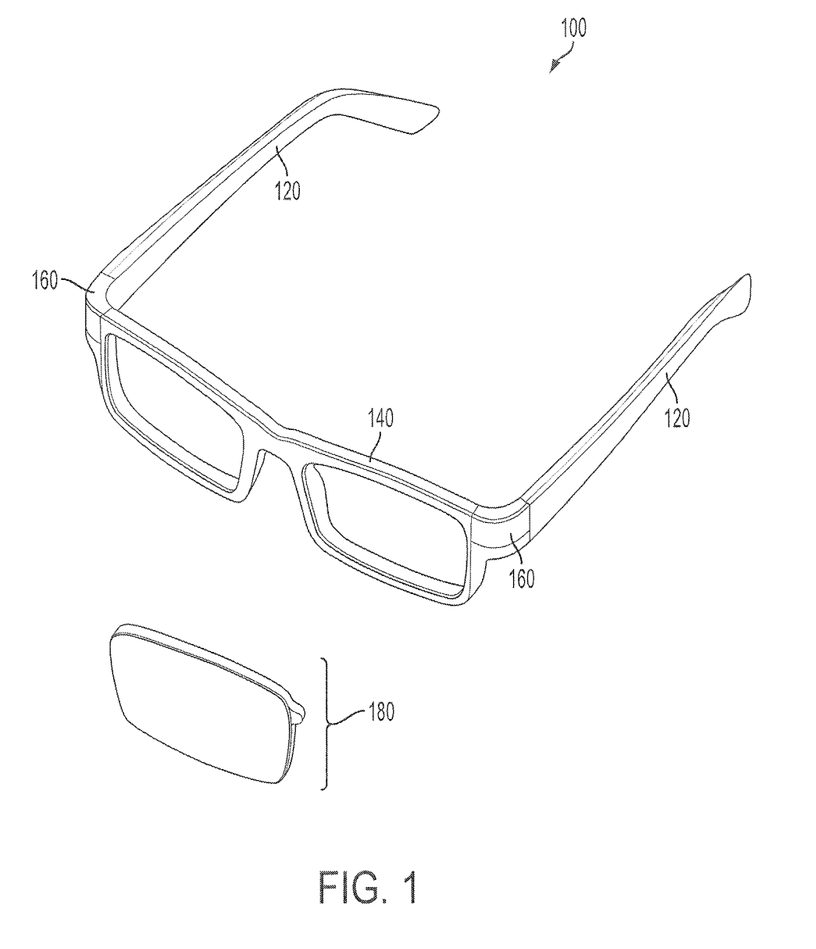
FIG. 1 partially depicts an exemplary pair of fluid-filled eyeglasses, according to an embodiment of the invention.

FIG. 1 is a partial illustration of an exemplary eyeglass assembly 100 with a fluid-filled lens, according to an embodiment of the present invention. The eyeglasses 100 include first and second temple pieces 120, a lens frame 140, hinges 160 coupling the temple pieces 120 to the frame 140, and at least one liquid-filled lens assembly 180.

Figure 2:
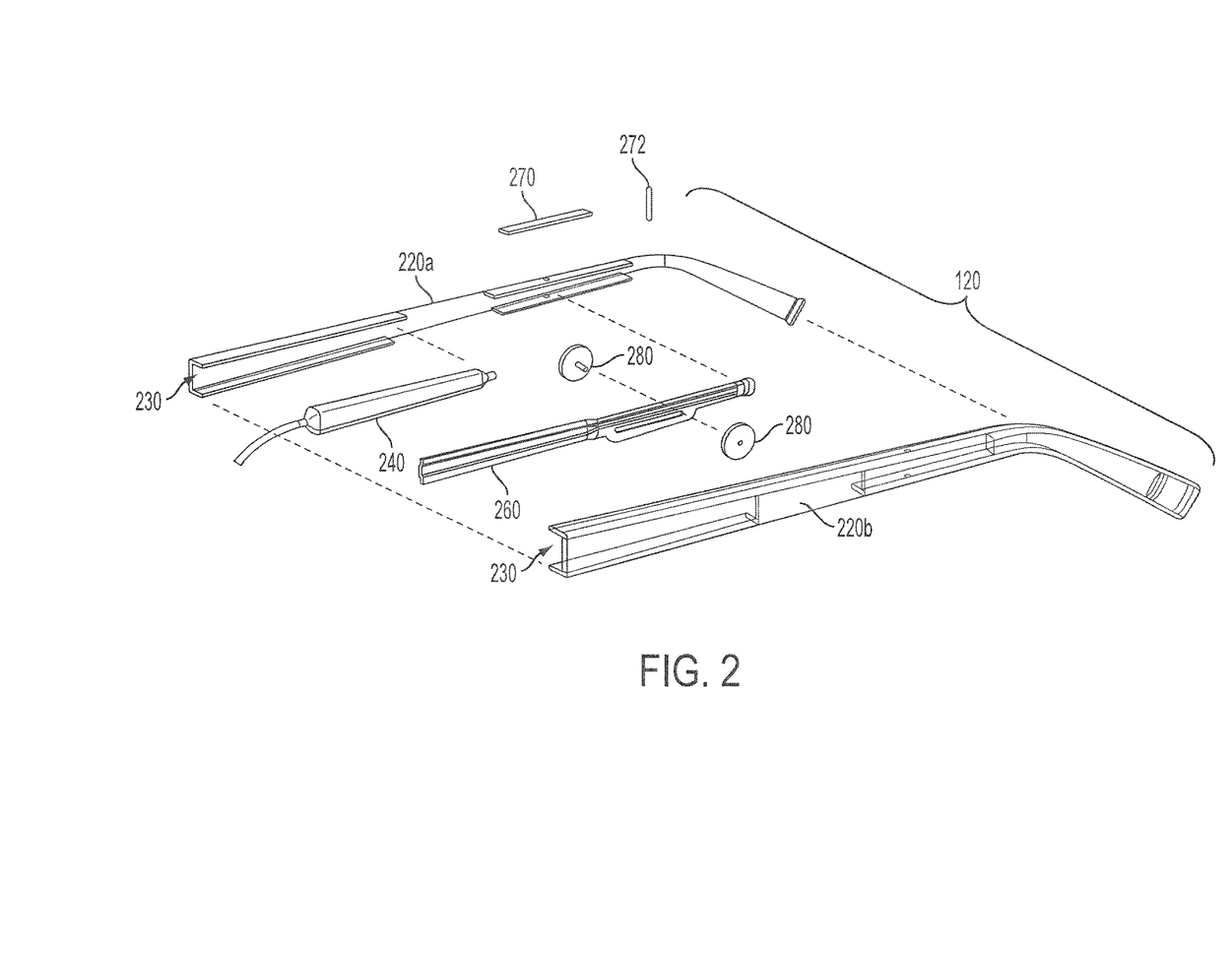
FIG. 2 illustrates an exploded view of one of the temple pieces of the fluid-filled eyeglasses shown in FIG. 1, according to an embodiment.

FIG. 2 illustrates an exploded detail of one of the temple pieces 120, according to an embodiment of the present invention. Temple piece 120 includes two outer shell pieces 220a and 220b. When the two outer shell pieces 220a and 220b are fitted together, they create a cavity 230 within the body of temple piece 120. A reservoir assembly 240 can be sized, shaped, and placed within cavity 230. In an embodiment, temple piece 120 also includes an assembly of a compression arm 260, a flexible tab 270, a pin 272 holding tab 270 in place, and an actuator 280. In one example, this assembly movably contacts a wider portion of reservoir assembly 240. In an embodiment, compression arm 260 is shaped such that in the confined environment of cavity 230 of the assembled temple piece 120, the contact with the wider portion of reservoir assembly 240 causes compression of the reservoir assembly 240 and pushes fluid out of said reservoir assembly. Conversely, in an embodiment, lessening of the contact between compression arm 260 and reservoir assembly 240 decompresses reservoir assembly 240 and causes fluid to be drawn into reservoir assembly 240.

Figure 3:
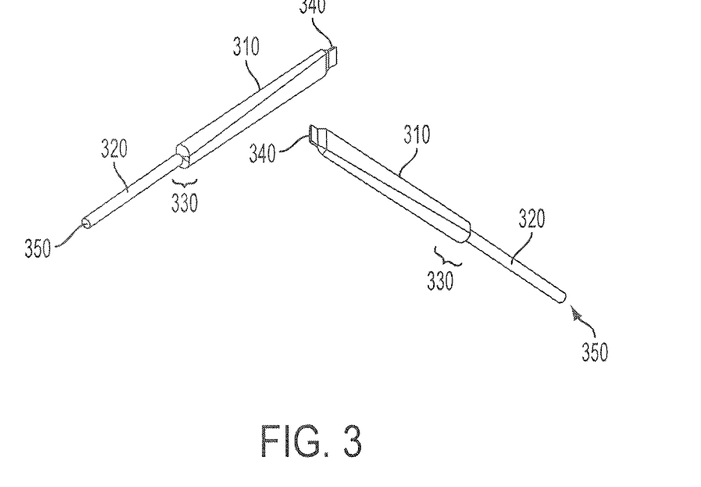
FIG. 3 illustrates a three dimensional view of a reservoir according to an embodiment, showing a relatively wide section and a relatively narrow section.

FIG. 3 illustrates an exemplary reservoir assembly 240 from multiple perspectives, according to an embodiment of the present invention. Reservoir assembly 240 includes a bladder 310, a connecting tube 320, a joint 330, a sealed end 340, and an open end 350. In one embodiment, reservoir 240 is typically of a bladder configuration 310, shaped to fit within temple piece 120 of an eyeglass assembly. Bladder 310 is positioned in cavity 230 inside temple piece 120. In an embodiment, bladder 310 contacts a thin, stiff movable metal plate, referred to herein as compression arm 260 (shown in FIG. 2), along its length. In an embodiment, bladder 310 may be cylindrical or ellipsoidal, to better fit the tapered shape of temple piece 120. In one example, the inner diameter may be 5.0 mm or less, such as 2.0 to 4.5 mm along the major axis and between 1.0 mm to 3.0 mm along the minor axis. In another example, the upper limit of the dimensions of bladder 310 is controlled by the size of temple piece 120 to be used with eyeglasses 100 and also by the maximum amount of force that may reasonably be generated by the mechanical action of an actuator (for example, the assembly in FIG. 2 including 260, 270, 272, and 280), and transmitted to compression arm 260 in contact with bladder 310. If this force is too high, it may cause bending of compression arm 260, thus dissipating some of the force. In an embodiment, there is also a direct correlation between the wall thickness of bladder 310, its stiffness under tensile and shear forces, and the dimensions of bladder 310.

Bladder 310 of reservoir assembly 240 is connected to a narrower portion, referred to herein as connecting tube 320, that carries the fluid from bladder 310 to fluid filled lens assembly 180 (as shown in FIG. 1). In an embodiment, bladder 310 and connecting tube 320 may be separately formed and joined together. In another embodiment, bladder 310 and connecting tube 320 are formed from a single tube of the reservoir material. Several processes may be developed to form the reservoir as a single unit and avoid having to form a joint 330, including, for example and without limitation, heat shrinking provided that the reservoir material is made of a heat shrinkable material; blow or injection molding, for example when the reservoir material is a thermoplastic; or machining, such as for prototype production.

In one example embodiment, connecting tube 320 has an inner diameter between 1.0 mm to 2.5 mm, such as between 1.0 mm and 1.5 mm. The lower limit controls the time required for the fluid to pass through connecting tube 320. For example, an inner diameter of the connecting tube of 1.2 mm allows the optical response to an adjustment of the actuator to be completed in less than 5 seconds, and, in an embodiment, less than 2 seconds. Since the wall thickness of connecting tube 320 is between 0.1 mm and 0.5 mm in this embodiment, the outer diameter may be between 3.5 mm and 1.2 mm. The upper limit is controlled by the maximum amount of bend allowance that can be provided by the hinge section, disclosed in U.S. patent application Ser. No. 12/904,760 incorporated herein by reference in its entirety, and the end piece without making eyeglasses 100 too bulky and stiff, as well as the bend radius that connecting tube 320 can achieve without developing a kink or a blockage.

Figure 4A:
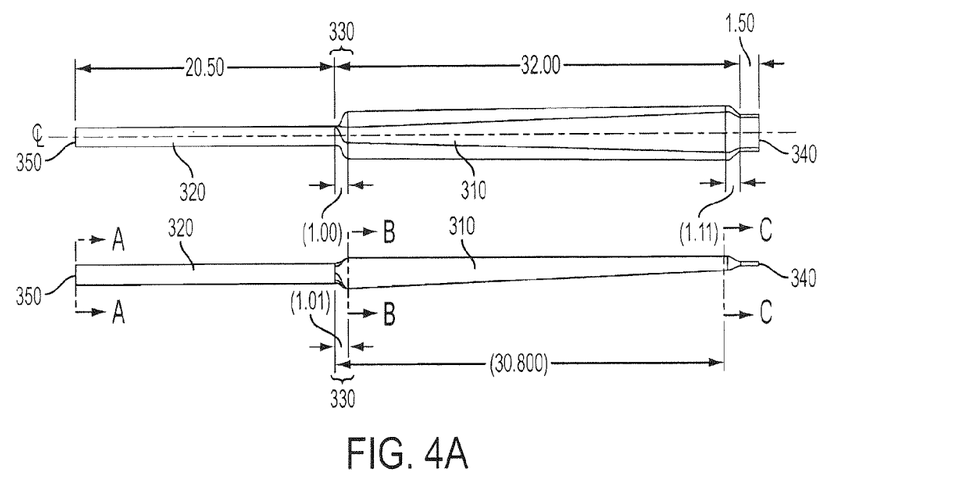
FIGS. 4A-4D are dimensioned drawings of a reservoir such as the reservoir shown in FIG. 3, according to an embodiment of the present invention.
Figure 4B:
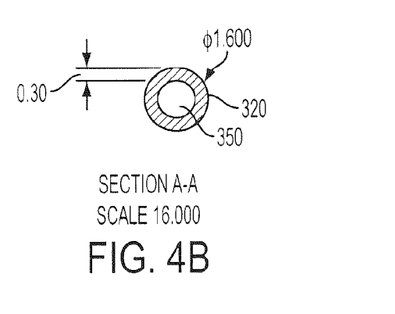
Figure 4C:
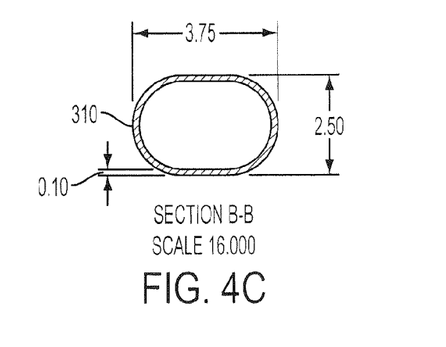
Figure 4D:
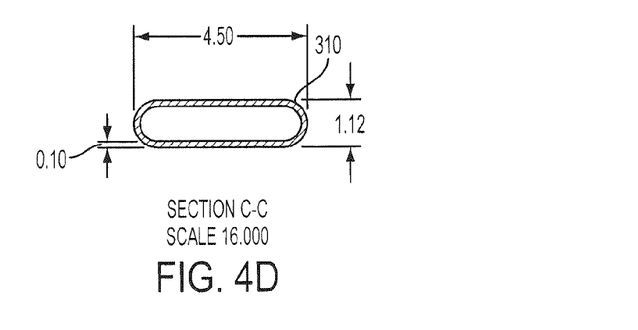

FIGS. 4A-4D provided detailed views and dimensions of an exemplary reservoir assembly 240, according to an embodiment of the present invention. The top portion of FIG. 4A illustrates a side view of reservoir assembly 240, while the bottom portion of FIG. 4A illustrates a top view of reservoir assembly 240. FIGS. 4B-4D illustrate cross-sectional views of reservoir assembly 240 along its length. FIG. 4B illustrates a cross-sectional view of open end 350 of connecting tube 320 (without a flared end). FIG. 4C illustrates a cross-sectional view of bladder 310 at or near joint 330. FIG. 4D illustrates a cross-sectional view of bladder 310 near sealed end 340. In this exemplary embodiment, the length from sealed end 340 to joint 330 is 32 mm, the length from joint 330 to open end 350 is 20.5 mm, the length of the joint is 1 mm, and the length of the sealed end 340 is 1.5 mm. Also in this exemplary embodiment, the diameter of cross-section A-A is 1.6 mm and the wall thickness is 0.3 mm. The major axis of elliptical cross-section B-B is 3.75 mm and the minor axis is 2.5 mm with a wall thickness of 0.1 mm. The major axis of elliptical cross-section C-C is 4.5 mm and the minor axis is 1.12 mm with a wall thickness of 0.1 mm.

Figure 5:
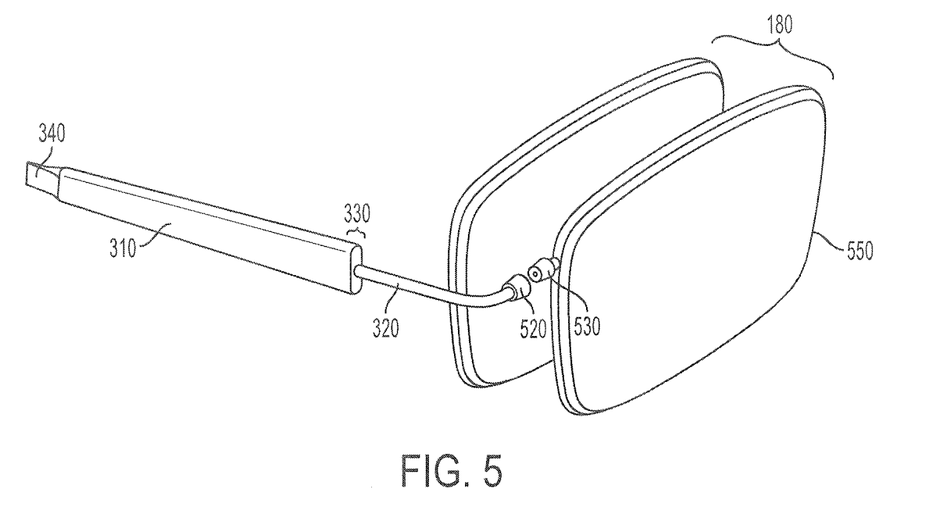
FIG. 5 depicts the reservoir in an exploded view of the sealed lens module, showing connecting ends of a narrow section of a reservoir and an inlet port located on a rigid lens of a sealed lens module, according to an embodiment of the present invention.

FIG. 5 illustrates the reservoir with an exploded view of the sealed lens module according to an embodiment, showing the connecting ends (e.g., flared end 520) of connecting tube 320 of reservoir 240 and an inlet port 530 located on rigid lens 550 of sealed lens module 180. As shown in FIG. 5, open end 350 of connecting tube 320 is flared to create flared end 520, and then fit over inlet port 530 of the fluid filled lens assembly, so that connecting tube 320 may be welded to inlet port 530 prior to any filling operation.

In each of these embodiments, it is important to select an appropriate material for the reservoir assembly. In an embodiment, this material is chemically inert, with minimum permeability to the fluid being used (e.g., silicone oil), so that no fluid is lost during 2-3 years of use. In an embodiment, the material is processable and highly flexible, because it may undergo tight bends along its length, particularly when the hinge is closed. In one example, the radius of curvature may be as little as 3.0 mm, or as low as 2.5 times the outer diameter of the connecting tube.

The following Table 1 shows exemplary materials that may be considered for reservoir 240.

TABLE 1

| Plastic | Thermal Properties | | | | Strength | | |
|---|---|---|---|---|---|---|---|
| Abbreviation (chemical name) Brand name | Tm °C. | Tg °C. | Td °C. | Cte ppm/°C. | Tensile psi | Compressive psi | Density g/cc |
| ECTFE (ethylene chlorotrifluoro ethylene copolymer) | 220 245 | | 116 | 80 | 6000 7000 | | 1.68 1.69 |
| ETFE (ethylene tetrafluoro-ethylene copolymer) Tefzel | 270 | | 104 | 59 | 6500 | 7100 | 1.7 |
| FEP (fluorinated ethylene-propylene copolymer) Teflon FEP | 275 | | 70 | | 2700 3100 | 2200 | 2.12 2.17 |
| PFA (perfluoroalkoxy) Teflon PFA | 310 | | 74 | | 4000 4300 | | 2.12 2.17 |
| PCTFE (polychlorotrifluoro-ethylene) | 220 | | 125 | 36 70 | 4500 6000 | 4600 7400 | 2.08 2.2 |
| PTFE (polytetrafluoroethylene) Teflon | 327 | | 121 | 70 120 | 2000 5000 | 1700 | 2.14 2.20 |
| PVF (polyvinylfluoride) Tedlar | | | | | | 7000 18000 | 1.38 1.57 |
| PVDF (polyvinylidenefluoride) Kynar | 174 178 | | 138 | 70 142 | 5200 7250 | 10900 14000 | 1.77 1.78 |
| (polycaprolactam) Nylon6 | 210 220 | | 185 190 | 80 83 | 7400 | 13000 16000 | 1.12 1.14 |
| PC (polycarbonate) Lexan | | 150 | 138 | 68 | 9500 | 12500 | 1.2 |
| PET (polyethyleneterephthalate) | 245 | 73 | 21 | 65 | 7000 | 11000 | 1.29 |
| Mylar | 265 | 80 | 38 | | 10500 | 15000 | 1.40 |
| LDPE (low density polyethylene) | 98 115 | −25 | 40 44 | 100 220 | 1200 4550 | | 0.917 0.932 |
| LLDPE (linear low density polyethylene) | 122 124 | | | | 1900 4000 | 0 | 0.918 0.940 |
| HDPE (high density polyethylene) | 130 | | 79 | 59 | 3200 | 2700 | 0.952 |

TABLE 1-continued

| Plastic Abbreviation (chemical name) Brand name | Thermal Properties | | | | Strength | | Density g/cc |
|---|---|---|---|---|---|---|---|
| | Tm °C. | Tg °C. | Td °C. | Cte ppm/°C. | Tensile psi | Compressive psi | |
| | 137 | | 91 | 110 | 4500 | 3600 | 0.965 |
| UHMWPE (ultra high molecular weight polyethylene) | 125 135 | | 68 82 | 130 | 5600 | | 0.940 |
| PI (polyimide) | | 310 365 | 277 360 | 45 56 | 10500 17100 | 30000 40000 | 1.36 1.43 |
| PMMA (polymethylmethacrylate) Plexiglas | | 85 105 | 79 107 | 50 90 | 7000 11000 | 10500 18000 | 1.17 1.20 |
| PP (polypropylene) | 168 175 | −20 | 107 121 | 81 100 | 4500 6000 | 5500 8000 | 0.900 0.910 |
| PS (polystyrene) Styron | | 74 105 | 68 96 | 50 83 | 5200 7500 | 12000 13000 | 1.04 1.05 |
| PVC (polyvinylchloride) | | 75 105 | 57 82 | 50 100 | 5900 7500 | 8000 13000 | 1.30 1.58 |
| PVDC (polyvinylidenechloride) Saran | 172 | −15 | 54 66 | 190 | 3500 5000 | 2000 2700 | 1.65 1.72 |

In an embodiment, fluorocarbon material may be used instead of a chlorofluorocarbon or other halocarbon materials in terms of a combination of impermeability, elasticity, and stiffness. For example, for a given embodiment, TYGON (polyvinyl chloride) is superior in terms of elasticity and stiffness but is not sufficiently impermeable to silicone oil such as DC 702 and DC 704 produced by Dow Corning Corp. of Midland, Mich. For a given embodiment, polyvinyledende difluoride (PVDF) may be used, because it has an optimal combination of elasticity, stiffness, and impeinieability. It is also highly processable, and may be heat shrunk, heat sealed, thermoformed, and injection molded. PVDF possesses excellent resistance to uptake of silicone oil both in heat shrunk and non heat shrunk forms.

Figure 6A:
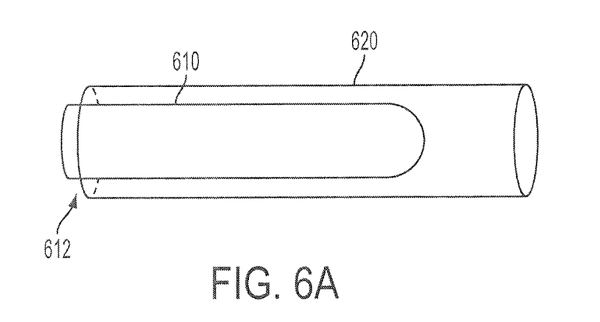
FIGS. 6A-6D illustrate an exemplary method for fabricating a reservoir, according to an embodiment.

FIGS. 6A-6D illustrate a reservoir fabrication method according to an embodiment of the present invention. FIG. 6A illustrates an initial step of fabricating a two piece reservoir. Initially, in an embodiment, a tubular profile 610 is formed with a cylindrical or elliptical cross-section. The cross-section of this tubular profile 610 is shaped and sized to fit within the cavity of a temple piece of the fluid-filled lens eyeglasses. Then, a first tubular piece of material 620, having a length somewhat longer than tubular profile 610, is placed over tubular profile 610 from one open end 612 of first tubular piece of material 620. Material 620 may be, for example, PVDF. Tubular profile 610 may be made from, for example, metal.

Figure 6B:
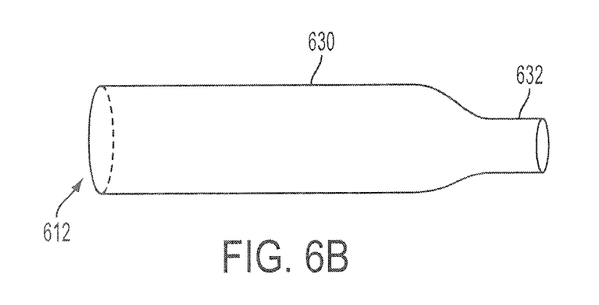

As seen in FIG. 6B, material 620 is then processed. In an embodiment, material 620 is processed using a heat treatment. During such a processing, material 620 shrinks and contracts around tubular profile 610, except where tubular profile 610 is not supporting material 620, in which case material 620 continues to contract, forming a small coupling and opening 632 relative to the cross-section of metal profile 610. The first processed material 630 is the base formation of a bladder.

Figure 6C:
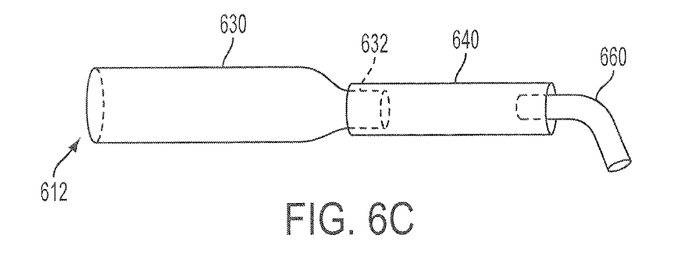

FIG. 6C illustrates another step of fabricating a two piece reservoir, according to an embodiment. Initially, in an embodiment, a second tubular piece of material 640 having a diameter smaller than first tubular piece of material 620 but larger than coupling 632, is placed over a flare profile 660. Flare profile may be made from, for example, metal. Flare profile 660 is shaped and sized to create a flared end of the connecting tube such that it will fit over an inlet port of a fluid-filled lens assembly. The other end of second tubular piece of material 640 is placed over coupling 632. Coupling 632 and the opening of second tubular piece of material 640 may have an adhesive applied to their inside and outside surfaces to connect first and second tubular pieces of material 620 and 640 together. The adhesive may be, for example and without limitation, DELO Duopox 01 Rapid or Duopox AD821 produced by DELO Industrie Klebstoffe GmbH of Windach, Germany.

Figure 6D:
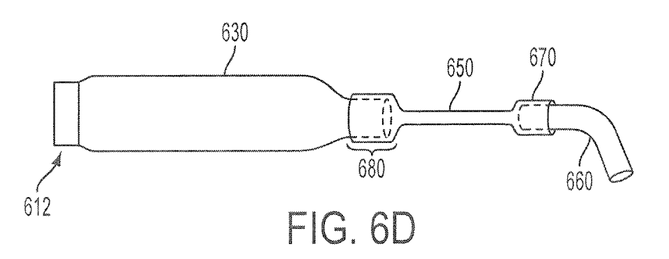

As seen in FIG. 6D, material 640 is then processed, e.g. by heat treatment, such that material 640 shrinks and contracts to form the connecting tube, except where the flare profile 660 is supporting material 640, in which case material 640 does not fully contract and forms a flared end 670, relative to the cross-section of processed connecting tube 650. Processed connecting tube 650 is also now permanently joined to bladder base 630 at joint 680. As previously stated, joint 680 may be further connected with an adhesive, may be sealed by only the contraction of the processed materials, or both. The final step of this reservoir fabrication method is to remove flare profile 660 and seal, e.g., with a heat treatment, open end 612 of the first tubular piece of material 620, now the processed base 630 for a bladder. Upon sealing of open end 612, the bladder becomes fully functional.

Figure 7A:
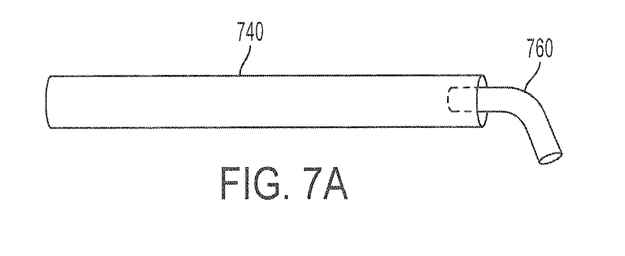
FIGS. 7A-7D illustrate another exemplary method of reservoir fabrication, according to an embodiment.

FIGS. 7A-7D illustrate another reservoir fabrication method, according to an embodiment of the present invention. FIG. 7A illustrates an initial step of fabricating a two piece reservoir. Initially, in an embodiment, a tubular section of a material 740 is placed over an inlet profile 760. Material 740 may be, for example, PVDF. Inlet profile 760 may be made from, for example, metal. Inlet profile 760 may be shaped and sized to create a flared end of material 740, such that material 740 will fit over the inlet port of the fluid-filled lens assembly once it has been processed.

Figure 7B:
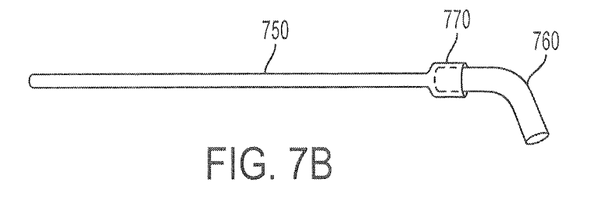

As seen in FIG. 7B, material 740 is then processed. In an embodiment, material 740 is processed by heat treatment, such that material 740 shrinks and contracts, except where inlet profile 760 is supporting material 740. In that case, material 740 does not fully contract and forms a flared end 770, relative to the cross-section of processed connecting tube 750.

Figure 7C:
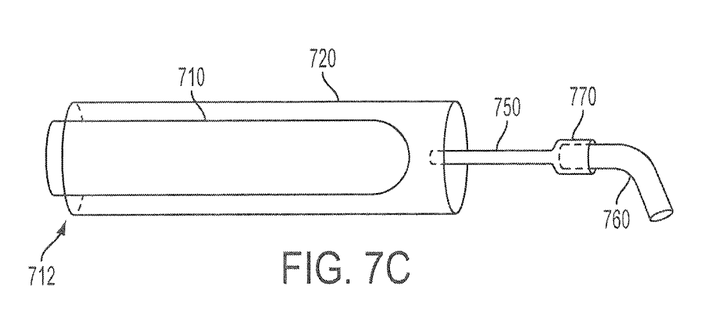

FIG. 7C illustrates another step of fabricating a two piece reservoir, according to an embodiment. In an embodiment, a tubular profile 710 is formed with a cylindrical or elliptical cross-section. Tubular profile 710 may be made from, for example, metal. The cross-section of tubular profile 710 may be shaped and sized to fit within the cavity of a temple piece of the fluid-filled lens eyeglasses. Then a tubular piece of material 720, having a length that is somewhat longer than tubular profile 710, is placed over tubular profile 710 from one open end 712 of the tubular piece of material 720. Material 720 may be, for example, VITON®, produced by DuPont Performance Elastomers of Wilmington, Del. The other end of the tubular piece of material 720 is placed over the non-flared end of processed connecting tube 750. The non-flared end of processed connecting tube 750 and the opening of the other end of the tubular piece of material 720 may have an adhesive, such as, but not limited to DELO Duopox 01 Rapid or Duopox AD821, applied to their inside and outside surfaces to connect the two tubular pieces of material 720 and material 740 together.

Figure 7D:
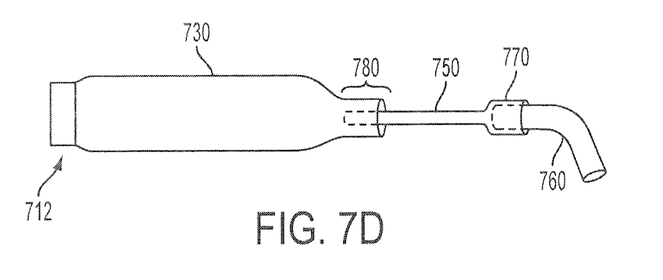

As seen in FIG. 7D, material 720 is then processed. In an embodiment, material 720 is processed by heat treatment. In such an embodiment, such that material 720 shrinks and contracts around the tubular profile 710, except where tubular profile 710 is not supporting material 720, in which case material 720 continues to contract, forming a joint 780 with connecting tube 750. The processed material 730 is the base formation of a bladder. Processed connecting tube 750 is also now permanently joined to bladder base 730 at joint 780. As previously stated, joint 780 may be further connected with an adhesive, may be sealed by only the contraction of the processed materials, or both. The final step of this reservoir fabrication method is to remove tubular profile 710 and seal open end 712 of tubular piece of material 720. This turns the now-processed material 730 into a base for a bladder. The open end may be sealed, for example, with a heat treatment. Upon sealing of the open end 712, the bladder becomes fully functional.

While FIGS. 6A-6D and 7A-7D are illustrative of two methods to fabricate the fluid-filled lens reservoir, they should not been seen as limiting examples. For example, the two portions of the reservoir can be formed as a single unit. Several processes may be developed to faun the reservoir as a single unit and avoid having to form a joint, including heat shrinking provided that the reservoir material is made of a heat shrinkable material; blow or injection molding, when the reservoir material is, for example, a thermoplastic; or machining, for example in prototype production.

Figure 8:
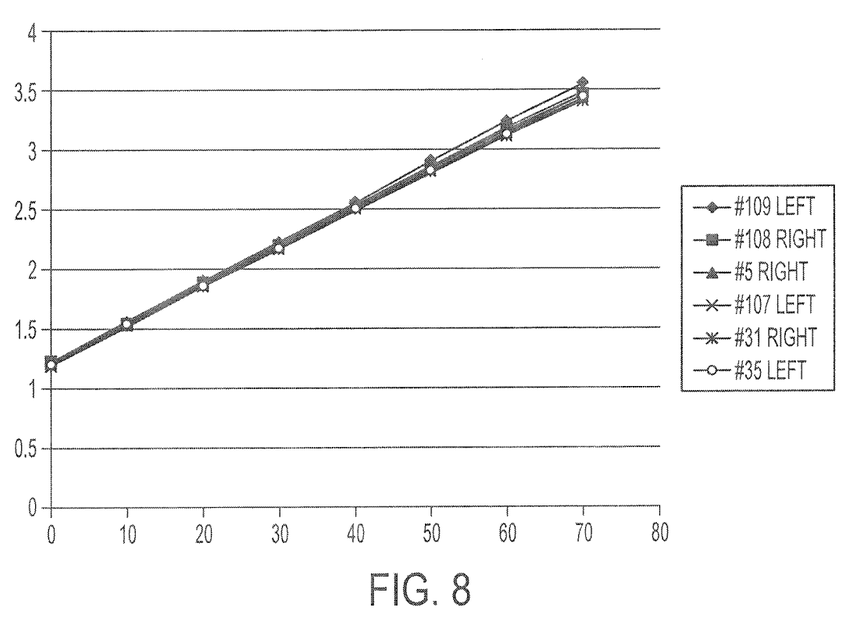
FIG. 8 shows results of optical tests performed to calculate the volume of a wide section of a reservoir that is in contact with a compressing means, according to an embodiment of the present invention. The data have been used to calculate the volume of the fluid required to be injected into the fluid filled lens cavity for each diopter of power increase, given a fluid filled lens of geometry shown in FIG. 5.

FIG. 8 shows the results of a test performed to compute the dimensions of the reservoir for one eyeglass design according to an embodiment. This test measured the volume of silicone oil required to create one diopter (1.0 D) increase in optical power of the fluid filled lens. This measurement used a prototype fluid filled lens assembly placed on a lensometer capable of measuring lens power. The fluid filled lens was connected and sealed to a reservoir shaped as shown in FIG. 3, by means of a connecting tube of appropriate length and diameter.

The data shows that fluid is indeed transferred from the reservoir to the lens cavity causing the membrane of the fluid lens to inflate and lens power to increase as predicted. The increase in power was linear with respect to the fluid volume, indicative of a linear response to the movement of the actuator means, such as a wheel or a screw. For this design, about 30 microliters of silicone oil was used to increase the optical power of the fluid filled lens by 1.0 D. Since a full power range of about 2.5 D may be desirable, the reservoir may be sized, in an embodiment, to deliver this amount of fluid without having to squeeze the reservoir out of its elastic zone, leaving approximately 60% of the fluid in the reservoir at the highest point of the power range.

Although various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

We claim:

1. An eyeglass reservoir system for storing fluid to supply a fluid filled lens of a pair of eyeglasses, comprising:
   a temple piece having a cavity;
   a single continuous tube including a first portion in the form of a bladder and a second portion in the form of a connecting tube,
   wherein the bladder portion is positioned within the cavity and able to repeatedly compress and relax, the bladder portion being made of a flexible material, and
   wherein the connecting tube portion is coupled to an inlet port of a lens module, the connecting tube portion being able to carry a fluid between the bladder portion and a fluid filled lens cavity of the lens module.

2. The eyeglass reservoir system of claim 1, wherein a shape of the bladder is cylindrical or ellipsoidal and the bladder is wider, respectively, than the connecting tube.

3. The eyeglass reservoir system of claim 2, wherein an inner diameter of the bladder is 1.0 mm to 5.0 mm.

4. The eyeglass reservoir system of claim 3, wherein an inner diameter of the bladder is between 2.0 and 4.5 mm along a major axis and 1.0 and 3.0 mm along a minor axis.

5. The eyeglass reservoir system of claim 1, wherein the material of the bladder is polyvinyledende difluoride.

6. The eyeglass reservoir system of claim 1, wherein the connecting tube is made of polyvinyledende difluoride.

7. The eyeglass reservoir system of claim 1, wherein an inner diameter of the connecting tube is between 1.0 and 2.5 mm.

8. The eyeglass reservoir system of claim 1, wherein an outer diameter of the connecting tube is between 1.2 and 3.5 mm.

9. The eyeglass reservoir system of claim 1, wherein the connecting tube further comprises:
   a flared end coupled to the inlet port of the lens module.

10. The eyeglass reservoir system of claim 9, wherein the flared end of the connecting tube facilitates connection and permanent affixation to the inlet port of the lens module.

11. An apparatus, comprising:
   a fluid lens module;
   a single continuous tube including a first portion in the form of a flexible bladder and a second portion in the form of a flexible connecting tube; and
   a compression arm able to apply pressure to the bladder portion,
   wherein the bladder portion is able to repeatedly compress and relax, and
   wherein the flexible connecting tube portion has a flared end coupled to the fluid lens module and a non-flared end coupled to the bladder portion, the connecting tube portion narrows and extends along a passage length of the bladder portion, and the connecting tube portion is able to carry a fluid between the bladder portion and the fluid lens module.

12. The apparatus of claim 11, wherein a shape of the bladder is cylindrical or ellipsoidal and the bladder is wider, respectively, than the connecting tube.

13. The apparatus of claim 11, wherein the bladder and the connecting tube are made of polyvinyledende difluoride.

14. The apparatus of claim 11, wherein the flared end of the connecting tube facilitates connection and permanent affixation to an inlet port of a fluid lens module.

15. A device manufacturing method, comprising:
placing a first unprocessed tube of a first processable material having a first diameter and first and second openings at opposite ends over a tubular reservoir profile having a cylindrical or elliptical cross-section, such that one end of the first unprocessed tube associated with the first opening and one end of the tubular reservoir profile are even;
processing the first processable material such that a first processed tube forms around the tubular reservoir profile and contracts, at the end associated with the second opening, smaller than the tubular reservoir profile to create a reduced diameter opening;
removing the tubular reservoir profile from the first processed tube;
sealing the first opening;
placing a first opening of a second unprocessed tube of a second diameter over the reduced diameter opening of the first processed tube, the second unprocessed tube being made of a second processable material;
placing an inlet profile in a second opening of the second unprocessed tube; and
processing the second processable material such that a second processed tube forms around the reduced opening of the first tube and the inlet profile to form a flared opening.

16. The device manufacturing method of claim 15, wherein the tubular reservoir profile fits within a cavity of an eyeglass temple piece.

17. The device manufacturing method of claim 15, wherein the first processable material and the second processable material are identical.

18. The device manufacturing method of claim 15, wherein the first processable material is polyvinyledende diflouride.

19. The device manufacturing method of claim 15, wherein the first processable material and the second processable material are different.

20. The device manufacturing method of claim 15, wherein a cross-section of the tubular reservoir profile has an outer diameter of between 2.0 and 4.5 mm along a major axis and 1.0 and 3.0 mm along a minor axis.

21. The device manufacturing method of claim 15, wherein the first opening of the first processed tube is sealed with an adhesive.

22. The device manufacturing method of claim 15, wherein the first opening of the first processed tube is sealed with heat.

23. The device manufacturing method of claim 15, wherein the second diameter is smaller than the first diameter, and the second diameter is larger than a diameter of the reduced diameter opening.

24. The device manufacturing method of claim 15, further comprising:
placing a first adhesive around an inside rim of the first opening of the first processed tube; and
placing a second adhesive around an outside rim of the reduced diameter opening, an inside rim of the first opening of the second processed tube, or both.

25. The device manufacturing method of claim 24, wherein the first adhesive and the second adhesive are identical.

26. The device manufacturing method of claim 24, wherein the first adhesive and the second adhesive are different.

* * * * *

UNITED STATES PATENT AND TRADEMARK OFFICE
CERTIFICATE OF CORRECTION

| | | |
|---|---|---|
| PATENT NO. | : 8,596,781 B2 | Page 1 of 1 |
| APPLICATION NO. | : 12/904736 | |
| DATED | : December 3, 2013 | |
| INVENTOR(S) | : Gupta et al. | |

It is certified that error appears in the above-identified patent and that said Letters Patent is hereby corrected as shown below:

On the Title page, Item [57], Lines 13-14, Delete "polyvinyledende" and insert --polyvinylidene--.
Col. 2, Lines 11-12, Delete "polyvinyledende" and insert --polyvinylidene--.
Col. 7, Line 29, Delete "polyvinyledende" and insert --polyvinylidene--.
Col. 10, Line 40, Delete "polyvinyledende" and insert --polyvinylidene--.
Col. 10, Line 42, Delete "polyvinyledende" and insert --polyvinylidene--.
Col. 11, Line 8, Delete "polyvinyledende" and insert --polyvinylidene--.
Col. 12, Line 8, Delete "polyvinyledende" and insert --polyvinylidene--.

Signed and Sealed this
Nineteenth Day of January, 2016

Michelle K. Lee
*Director of the United States Patent and Trademark Office*